United States Patent Office 2,870,891
Patented Jan. 27, 1959

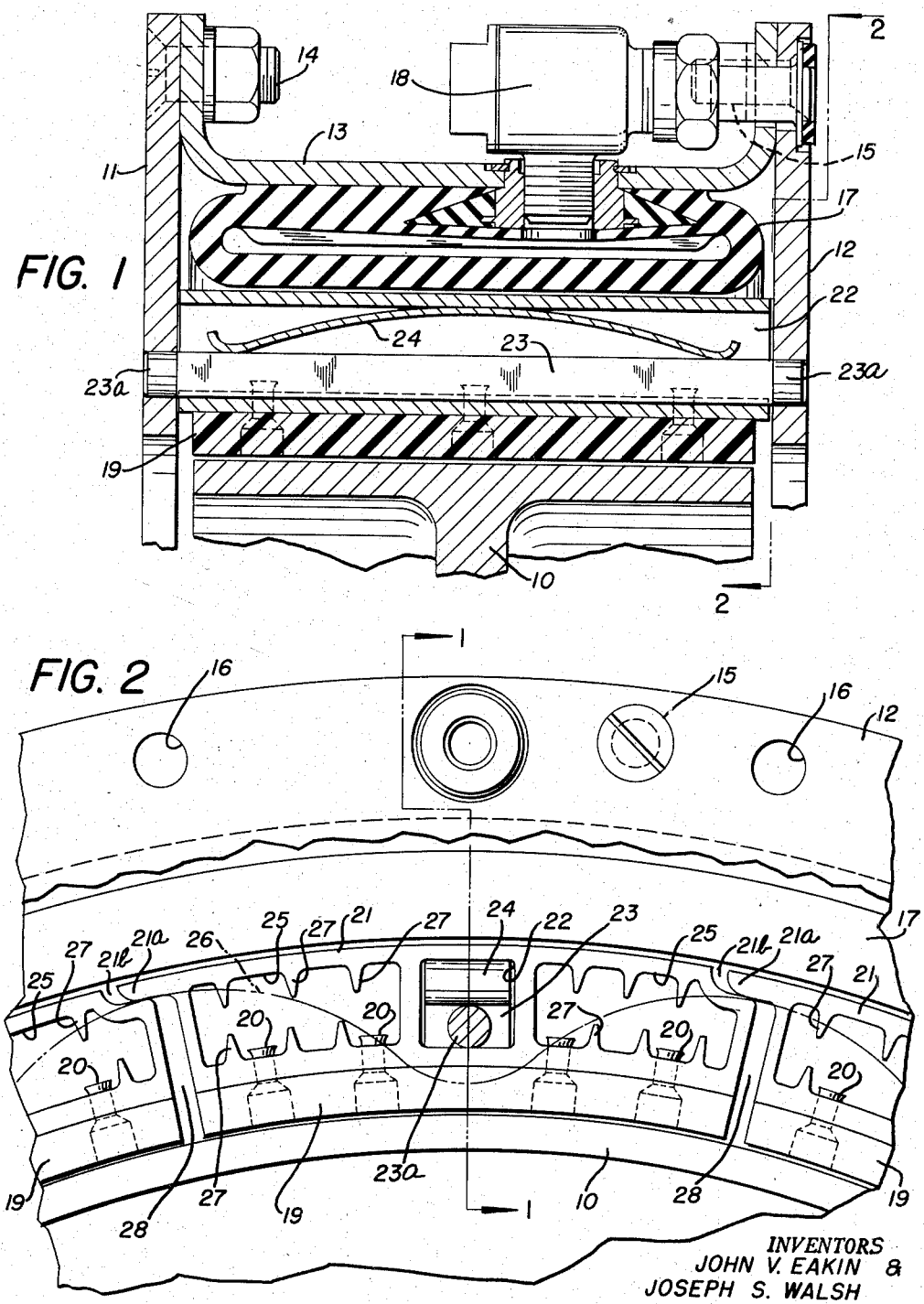

2,870,891
ASSEMBLY FOR CLUTCHES AND BRAKES

John V. Eakin, Rocky River, and Joseph S. Walsh, Fairview Park, Ohio, assignors to Fawick Corporation, a corporation of Michigan Application May 21, 1954, Serial No. 431,340

1 Claim. (Cl. 192—88)

This invention relates to assemblies adapted to be used in torque-sustaining clutches and brakes and comprising a frictional-engagement drum, a set of wear-shoes and a fluid-distensible flexible element for actuating the wear-shoes.

Its chief objects are to provide an assembly having the advantages of facility and economy of construction and of assembly and disassembly, as in the case of repair or substitution of parts; efficiency and dependability of operation; and durability.

Of the accompanying drawings:

Fig. 1 is a fragmentary axial section, on line 1—1 of Fig. 2, of an assembly embodying my invention in its preferred form.

Fig. 2 is a fragmentary section of the same, on line 2—2 of Fig. 1.

The assembly shown in the drawings is designed for use as a clutch of the constricting type but of course the invention is not wholly limited thereto.

The assembly comprises a clutch-drum 10 secured upon a shaft, not shown, and a constricting structure adapted to be secured to a shaft-head or an adapter ring, not shown, on the other shaft or rotary torque-sustaining means.

The said constricting structure comprises a pair of axially spaced-apart side rings 11, 12 connected by an outwardly open, U-section spacer and bag-mounting ring 13. The latter is secured to the ring 11 by bolts such as the bolt 14, Fig. 1, and is held in assembled relation to the ring 12, for shipment, by two or more bolts such as the bolt 15, the ring 12 and the adjacent flange of the ring 13 being formed with sets of registered holes, at 16, 16, Fig. 2, for bolting the structure to the shaft-head or adapter ring, not shown.

Secured as by vulcanized adhesion to the inner face of the spacer ring, or preferably only laid in place, for ease of removal, 13 is a fluid-distensible annular diaphragm or bag 17 provided with an inlet and quick-release exhaust valve 18 having provision as shown for connecting it to a source adapted to supply pressure fluid to and release it from the bag 17 while the latter is rotating, as will be readily understood by those skilled in the art.

A set of wear-shoes, adapted to be forced against the drum 10 by inward distension of the bag 17, toward the axis of rotation, and to be withdrawn outwardly from the drum by springs, are mounted between the rings 11, 12.

Each wear-shoe assembly comprises a friction facing 19 secured by rivets 20, 20 to a ventilating base member 21. The latter is formed midway of its length with a driving-interlock hole or "tunnel" 22 of rectangular cross-sectional shape in which is mounted a torque-sustaining bar having a cross-sectionally rectangular part 23 for torque-sustaining contact with a wall of the hole 22 and, at each end of the part 23, a cylindrical tenon 23ª fitted in a hole formed in the adjacent one of the rings 11, 12.

This arrangement makes the use of bolts unnecessary at the positions of the torque bars and permits the outer faces of the side rings 11, 12, to be smooth and free of dangerously projecting bolt-heads or nuts, while providing great strength of structure for sustension of the torque.

The rectangular portion 23 of the bar is of less dimension radially of the assembly than the rectangular hole in which it is mounted, to permit radially inward and outward movement of the shoe for clutch engagement and disengagement, and for accommodating a single-leaf bow spring 24 having its ends seated upon the radially outer face of the bar and its middle part bearing against the radially outer wall of the hole 22 for constantly but yieldingly urging the shoe away from the drum 10.

The construction as described is such that each spring 24 is effectively boxed in on all sides and thus substantially enclosed so that even in the case of the breaking of a spring there is no danger of a spring or a piece of a spring being thrown from the assembly by centrifugal force or dangerously projecting through a side ring 11 or 12, those rings having in the vicinity of the spring no aperture except the hole that is fully closed by the cylindrical tenon 23ª of the torque bar. Yet the springs, torque bars and wear-shoe assemblies can readily be removed individually, in an axial direction, when either of the side rings 11, 12 has been removed.

At each side of the part of the shoe-base member 21 that defines the hole 22 the member 21 is formed with a ventilating passage 25 extending axially through it, and between each torque-sustaining bar 23—23ª and the next the inner periphery of each of the side rings 11, 12 is bayed outwardly, as shown by the broken or phantom line 26, Fig. 2, as to the ring 12, to permit free passage of cooling air to, through and from the passages 25 in the shoe-base member 21.

The walls defining those passages are shown as being formed with cooling ribs 27, 27 Fig. 2, projecting into the passages.

Each of the shoe-base members 21 is formed at one end of its radially outward, bag-contacting part, with a circumferentially projecting lip 21ª which extends into and approximately fills a groove or shoulder depression 21ᵇ formed on the adjacent radially outer corner of the adjacent shoe-base member. This stabilizes the shoes in relation to one another, provides almost continuous contact of shoe-bases with the bag 17 while permitting sufficient space between the shoe-bases as at 28 for ventilating passage of air, and is a factor in preventing undesirable rocking of the shoes by the torque. At the same time the overlapping of the shoe ends as at 21ª and 21ᵇ, a feature that is simplified by the mounting of the torque-bars and springs elsewhere, prevents direct flight of sparks from the wear shoes to the readily burnable rubber bag 17, as does also the feature of the shoe-base member 21 being substantially wider than the bag 17 and the friction facing 19, as clearly shown in Fig. 1, with only small clearance between the shoe-base member and each of the side rings 11, 12.

The shoe-base members 21 can be economically made as castings.

Any one or all or the wear-shoe assemblies can be readily removed or mounted when one of the rings 11, 12 is removed and assembly or disassembly of the spring 24 and/or the bar 23—23ª with relation to the shoe-base member is an easy operation.

The operation of the assembly will be clearly manifest from the foregoing description.

Modifications are possible without departure from the scope of the invention as defined in the appended claim.

We claim:

An assembly comprising two relatively rotatable structures one within the other and adapted for frictional, torque-sustaining engagement with each other, the inner one of said structures having an outwardly presented frictional-engagement face and the outer of said structures being rotatably mounted and comprising a set of wear-shoe assemblies, a fluid-distensible diaphragm for urging said assemblies radially inward toward said face in being distended, a mounting for said diaphragm comprising rigid side rings lying adjacent opposite sides of the diaphragm and the wear-shoe assemblies, each of said wear-shoe assemblies comprising a rigid structure having a frictional-engagement face and formed, at a position between its forward and rear ends, with a hole extending axially through it from adjacent one to adjacent the other of the said side rings, said hole having walls on all sides, all the walls of said hole being continuous and uninterrupted between the ends of the hole, a torque-sustaining bar extending through said hole in torque-transmitting relation to a wall of the hole, the end portions of the bar being interlocked with said rings respectively against relative movement under the force of the torque, and a spring mounted in the said hole for yieldingly urging the wear-shoe assembly away from the frictional-engagement face first above mentioned, the spring being of the leaf type, extending lengthwise of the torque-sustaining bar, and being seated against said bar and against a wall of the hole, and the spring being substantially enclosed by the side rings, the torque-sustaining bar, and the walls of the defined hole.

References Cited in the file of this patent
UNITED STATES PATENTS

| | | |
|---|---|---|
| 1,682,824 | Beck | Sept. 4, 1928 |
| 2,349,494 | Fawick | May 23, 1944 |
| 2,620,909 | Moon | Dec. 9, 1952 |

FOREIGN PATENTS

| | | |
|---|---|---|
| 683,671 | Great Britain | Dec. 3, 1952 |
| 684,261 | Great Britain | Dec. 17, 1952 |